(12) United States Patent
Fujii et al.

(10) Patent No.: US 7,226,688 B2
(45) Date of Patent: *Jun. 5, 2007

(54) FUEL CELL

(75) Inventors: Yosuke Fujii, Tochigi-ken (JP); Noriaki Osao, Ibaraki-ken (JP); Yoshinori Wariishi, Utsunomiya (JP); Takaki Nakagawa, Utsunomiya (JP); Hiroshi Shinkai, Utsunomiya (JP); Katsumi Hayashi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 547 days.

This patent is subject to a terminal disclaimer.

(21) Appl. No.: 10/679,119

(22) Filed: Oct. 3, 2003

(65) Prior Publication Data

US 2004/0115512 A1 Jun. 17, 2004

Related U.S. Application Data

(63) Continuation-in-part of application No. 09/656,910, filed on Sep. 7, 2000, now Pat. No. 6,686,085.

(30) Foreign Application Priority Data

Sep. 10, 1999 (JP) ................................ 11-257009
Aug. 2, 2000 (JP) .............................. 2000-234873

(51) Int. Cl.
*H01M 2/14* (2006.01)

(52) U.S. Cl. .......................................... 429/38; 439/39

(58) Field of Classification Search .................. 429/38, 429/39
See application file for complete search history.

(56) References Cited

U.S. PATENT DOCUMENTS

| | | | |
|---|---|---|---|
| 5,108,849 A | 4/1992 | Watkins et al. | |
| 5,230,966 A | 7/1993 | Voss et al. | |
| 5,472,801 A | 12/1995 | Mattejat et al. | 429/39 |
| 5,514,487 A | 5/1996 | Washington et al. | |
| 5,998,055 A * | 12/1999 | Kurita et al. | 429/34 |
| 6,066,409 A | 5/2000 | Ronne et al. | 429/39 |
| 6,174,616 B1 | 1/2001 | Marvin et al. | 429/34 |
| 6,232,008 B1 | 5/2001 | Wozniczka et al. | 429/39 |
| 6,500,580 B1 | 12/2002 | Marvin et al. | 429/39 |

(Continued)

FOREIGN PATENT DOCUMENTS

EP 940868 A2 9/1999

(Continued)

*Primary Examiner*—Patrick Joseph Ryan
*Assistant Examiner*—Julian Mercado
(74) *Attorney, Agent, or Firm*—Lahive & Cockfield, LLP; Anthony A. Laurentano, Esq.

(57) ABSTRACT

A fuel gas inlet is provided at an outer circumferential edge portion of a second separator. First fuel gas flow passage grooves for supplying a fuel gas to an anode electrode are formed on a side of a surface of the second separator. First fuel gas connecting flow passages, which make communication between the fuel gas inlet and the first fuel gas flow passage grooves, include flow passage grooves which are provided on a side of a surface, and through-holes which penetrate through the second separator to make communication with the first fuel gas flow passage grooves. Accordingly, excellent sealing performance is ensured with a simple structure, and it is possible to realize a thin-walled fuel cell.

15 Claims, 18 Drawing Sheets

U.S. PATENT DOCUMENTS

| | | |
|---|---|---|
| 6,524,735 B1 | 2/2003 | Wariishi et al. |
| 2002/0119359 A1 | 8/2002 | Yamazaki et al. ............ 429/32 |

FOREIGN PATENT DOCUMENTS

| | | |
|---|---|---|
| JP | 03257760 A | 11/1991 |
| JP | 8-138695 | 5/1996 |
| JP | 09-055216 | 2/1997 |
| JP | 64-71071 | 3/1998 |
| JP | 10-172585 | 6/1998 |
| JP | 2002-015751 | 1/2002 |
| JP | 2002-083614 | 3/2002 |
| JP | 2002-203578 | 7/2002 |
| JP | 2002-260688 | 9/2002 |
| JP | 2002-298875 | 10/2002 |
| WO | WO 96/37920 | 11/1996 |
| WO | WO 00/21153 A1 | 4/2000 |

* cited by examiner

FUEL CELL

RELATED APPLICATIONS

This application is a continuation-in-part of U.S. Ser. No. 09/656,910 filed on Sep. 7, 2000 now U.S. Pat. No. 6,686,085, which claims priority to Japanese Patent Application No. 11-257009 filed on Sep. 10, 1999 in Japan. This application also claims priority to Japanese Patent Application No. 2000-234873 filed Aug. 2, 2000 in Japan. The contents of the aforementioned applications are hereby incorporated by reference.

BACKGROUND OF THE INVENTION

1. Field of the Invention

The present invention relates to a fuel cell comprising a fuel cell unit composed of an electrolyte interposed between an anode electrode and a cathode electrode, and separators for supporting the fuel cell unit interposed therebetween.

2. Description of the Related Art

For example, the solid polymer type fuel cell comprises a fuel cell unit including an anode electrode and a cathode electrode disposed opposingly on both sides of an electrolyte composed of a polymer ion exchange membrane (cation exchange membrane) respectively, the fuel cell unit being interposed between separators. Usually, the solid polymer type fuel cell is used as a fuel cell stack obtained by stacking a predetermined number of the fuel cell units.

In such a fuel cell, a fuel gas such as a hydrogen-containing gas, which is supplied to the anode electrode, is converted into hydrogen ion on the catalyst electrode, and the ion is moved toward the cathode electrode via the electrolyte which is appropriately humidified. The electron, which is generated during this process, is extracted for an external circuit, and the electron is utilized as DC electric energy. An oxygen-containing gas such as a gas containing oxygen or air is supplied to the cathode electrode. Therefore, the hydrogen ion, the electron, and the oxygen gas are reacted with each other on the cathode electrode, and thus water is produced.

In the fuel cell described above, an internal manifold is constructed in order to supply the fuel gas and the oxygen-containing gas (reaction gas) to the anode electrode and the cathode electrode of each of the stacked fuel cell units respectively. Specifically, the internal manifold includes a plurality of communication holes which are provided in an integrated manner to make communication with each of the fuel cell units and the separators which are stacked with each other. When the reaction gas is supplied to the supplying communication hole, the reaction gas is supplied in a dispersed manner to each of the fuel cell units, while the used reaction gas is integrally discharged to the discharging communication hole. The fuel cell is supplied with a cooling medium in order to cool the electrode power-generating surface. The internal manifold is provided with communication holes for the cooling medium in some cases, in the same manner as for the reaction gas.

As shown in FIG. 14, for example, Japanese Laid-Open Patent Publication No. 3-257760 discloses, as such a technique, a fuel cell in which a fuel cell unit 3 including an electric cell three-layered film 2 formed on a surface of a film formation substrate 1 is interposed between separators 4, and the separators 4 are formed with an internal manifold 5 for allowing the fuel gas and the oxygen-containing gas to flow.

However, in the conventional technique described above, in order to reliably effect the gas seal for the internal manifold 5, a seal plate 7 is installed via spacers 6a, 6b between the separators 4. Gaskets 8 are interposed between the separator 4 and the spacer 6a, between the spacer 6a and the seal plate 7, between the seal plate 7 and the spacer 6b, and between the spacer 6b and the separator 4 respectively. As a result, the following problem is pointed out. That is, the dimension of the fuel cell unit 3 in the stacking direction (direction of the arrow X) is considerably lengthy, the number of parts is increased, and the production cost becomes expensive.

Accordingly, as shown in FIG. 15, the following structure is adopted. That is, introducing sections 5c, which are used to make communication between a communication hole 5a of the internal manifold of the separator 4a and fluid flow passages 5b for allowing the reaction gas to flow into the surface of the separator 4a, are formed on the same plane as that of the fluid flow passages 5b. In order to ensure the sealing performance of the introducing sections 5c, a thin plate-shaped cover 9 is fitted to the introducing sections 5c to allow the gasket 8a to forcibly abut against the cover 9 (see FIG. 16).

However, a step is required to fit the considerably thin-walled cover 9 to the introducing section 5c as described above to assemble the fuel cell so that the surface of the cover 9 is flush with the surface of the separator 4a. An operation to stick (fit) the cover 9 is complicated. Further, the following problem is pointed out. That is, it is feared that the cover 9 may be lost during the assembling of the cell or during the stacking of the cell, resulting in leakage of the reaction gas. Further, any difference in height arises between the surface of the cover 9 and the surface of the separator 4a. It is impossible to apply the uniform tightening force to the separator 4a when the cell is tightened.

When a communication hole for the cooling medium is provided for the internal manifold of the separator, it is also necessary to use the thin plate-shaped cover. As a result, the same problem as that for the reaction gas described above arises.

In order to dissolve the inconvenience as described above, for example, a fuel cell stack disclosed in U.S. Pat. No. 6,066,409 is known. In the fuel cell stack, as shown in FIG. 17, a separator 4b is constructed by combining two separators 4b1, 4b2. An internal manifold is arranged at a central portion thereof. Specifically, communication holes, i.e., a supply port 5d1 and a discharge port 5d2 for the reaction gas on the first side, and a supply port 5e1 and a discharge port 5e2 for the reaction gas on the second side are formed to penetrate in the thickness direction of the separator 4b.

As shown in FIG. 18, flow passage grooves 5f1, 5f2, which communicate with the supply port 5d1 and the discharge port 5d2 on the first side and which extend toward the outer circumferential side along a non-power-generating surface 4c1, are formed on the non-power-generating surface (non-reaction surface) 4c1 of the separator 4b. Further, flow passage grooves 5g1, 5g2, which communicate with the supply port 5e1 and the discharge port 5e2 for the reaction gas on the second side and which extend toward the outer circumferential side along the non-power-generating surface 4c1, are formed on the non-power-generating surface 4c1 of the separator 4b. A plurality of cooling air flow passage grooves 5j are formed in parallel to one another on the non-power-generating surface 4c1. Both ends of the cooling air flow passage grooves 5j are open toward the outside from the outer circumferential end of the non-power-generating surface 4c1.

Through-holes 5*h*1, 5*h*2 communicate with outer ends of the flow passage grooves 5*f*1, 5*f*2. The through-holes 5*h*1, 5*h*2 communicate with the reaction gas flow passage 5*i* on the side of the power-generating surface 4*c*2 of the separator 4*b*1 (see the separator 4*b*2 in FIG. 17). The reaction gas flow passage 5*i* is provided along the plane of the power-generating surface 4*c*2. A gasket 8*b*, which is used to prevent the different reaction gases from being mixed in the internal manifold, is interposed between the separators 4*b*1, 4*b*2.

In the arrangement as described above, when the first reaction gas is supplied to the supply port 5*d*1 which constitutes the internal manifold, the reaction gas is moved to the outer circumferential side of the separator 4*b* along the flow passage groove 5*f*1 communicating with the supply port 5*d*1. The reaction gas passes through the through-hole 5*h*1 communicating with the outer end of the flow passage groove 5*f*1, and it is supplied to the side of the power-generating surface 4*c*2. The reaction gas flow passage 5*i* is provided on the side of the power-generating surface 4*c*2. The reaction gas is supplied to an unillustrated fuel cell unit, while moving along the reaction gas flow passage 5*i*. The reaction gas, which is not used, is supplied from the through-hole 5*h*2 to the flow passage groove 5*f*2, and it is discharged to the outside from the discharge port 5*d*2 which constructs the internal manifold.

However, in the case of the conventional technique described above, the internal manifold is provided at the central portion of the separator 4*b*. For example, the following problem arises. That is, when the reaction gas supplied to the supply port 5*d*1 is fed from the through-hole 5*h*1 to the side of the power-generating surface 4*c*2 after being introduced into the flow passage groove 5*f*1, the pressure loss is increased, because the flow passage groove 5*f*1 is considerably lengthy. Further, the first reaction gas is introduced from the supply port 5*d*1 into the single flow passage groove 5*f*1, and it is further supplied to the reaction gas flow passage 5*i* via the single through-hole 5*h*1. Therefore, it is impossible to allow a large amount of the reaction gas to smoothly flow therethrough. As a result, the following problem is pointed out. That is, it is difficult to operate the fuel cell stack at a high current density.

The separator 4*b* is constructed by superimposing the pair of separators 4*b*1, 4*b*2. Therefore, it is necessary to mutually superimpose the cooling air flow passage grooves 5*j* formed on the non-power-generating surface 4*c*1 of the separators 4*b*1, 4*b*2. However, the cooling air flow passage groove 5*j* is a minute gap. It is considerably complicated to perform the operation for accurately superimpose the cooling air flow passage grooves 5*j* with each other. Further, the fuel cell stack is constructed such that the power-generating surface 4*c*2 is air-cooled by supplying the air to the cooling air flow passage groove 5*j*. For this reason, the following inconvenience arises. That is, the cooling ability is lowered as compared with the water-cooling, and it is difficult to perform the operation especially at a high current density.

Further, the cooling air flow passage groove 5*j* is provided at only the both side portions except for the central portion of the separator 4*b* which constructs the internal manifold. Therefore, the following problem arises. That is, it is impossible to effectively cool the entire surface of the power-generating surface 4*c*2, and the cooling efficiency is lowered.

SUMMARY OF THE INVENTION

A principal object of the present invention is to provide a fuel cell which makes it possible to ensure the sealing performance with a simple structure, reduce the number of parts so that the fuel cell is thin-walled, and ensure desired power generation performance.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
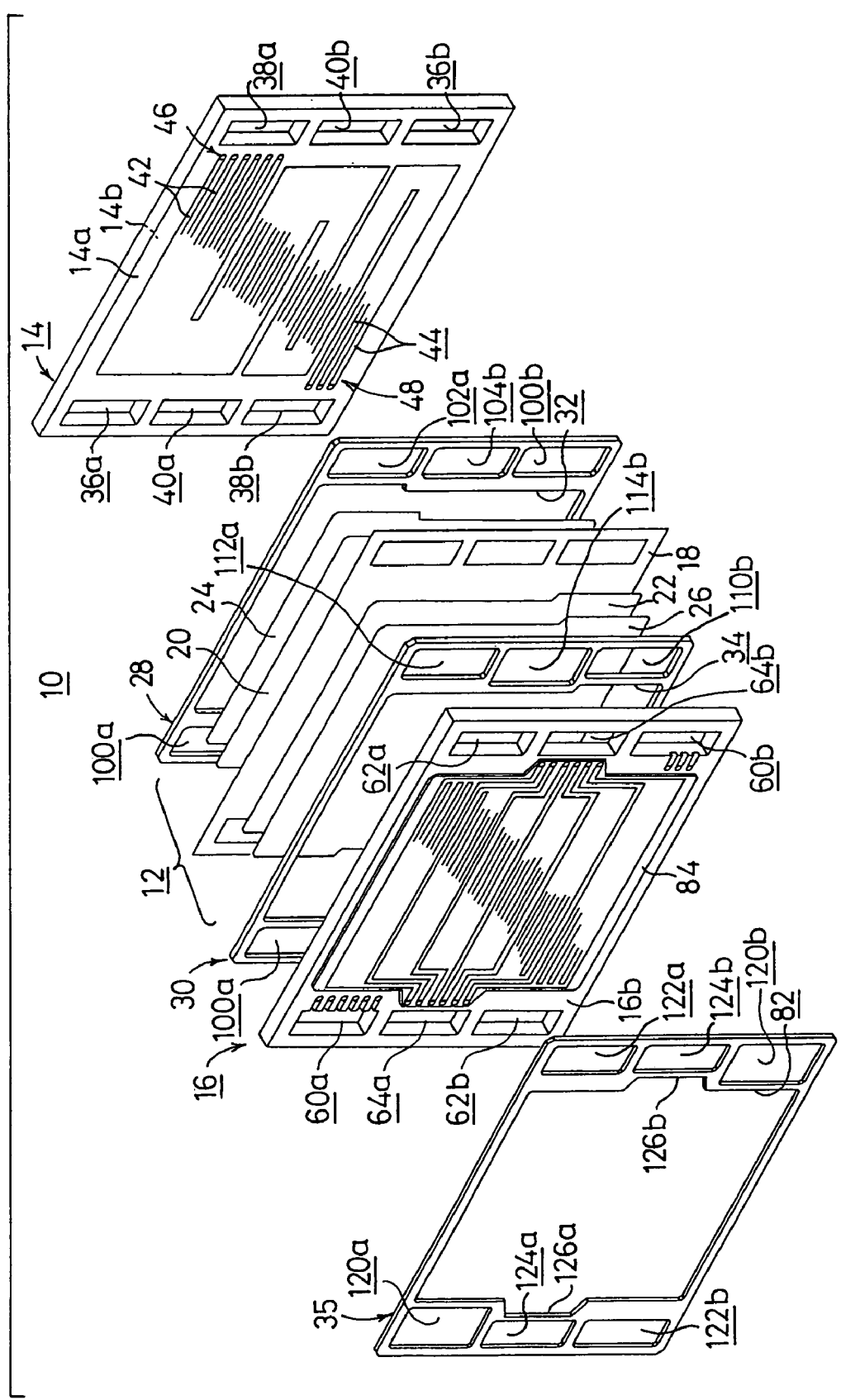
FIG. 1 is an exploded perspective view illustrating principal parts of a fuel cell according to a first embodiment of the present invention.
Figure 2:
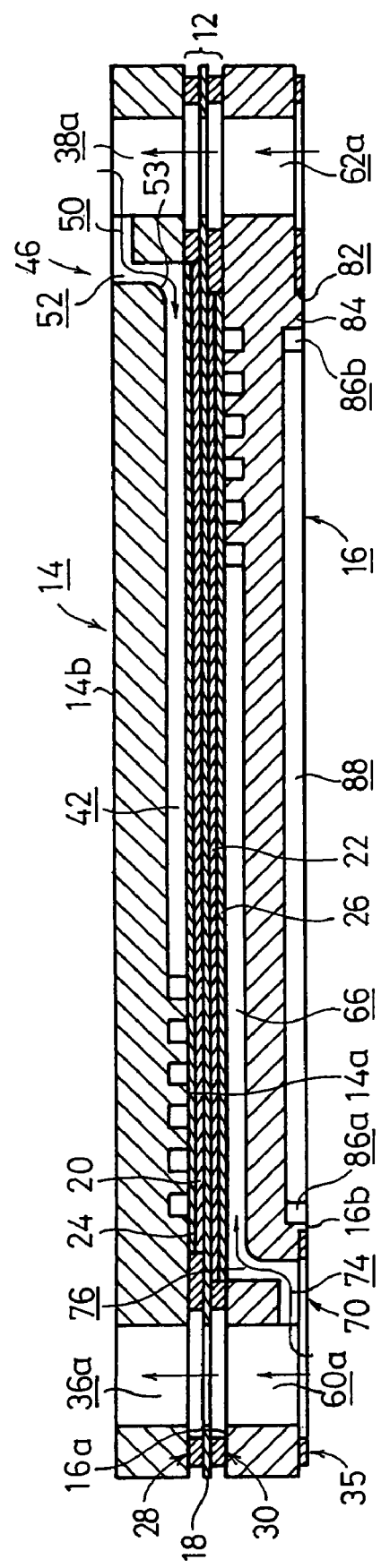
FIG. 2 is a schematic vertical sectional view illustrating the fuel cell.

FIG. 1 is an exploded perspective view illustrating principal parts of a fuel cell 10 according to a first embodiment of the present invention, and FIG. 2 is a schematic vertical sectional view illustrating the fuel cell 10.

The fuel cell 10 comprises a fuel cell unit 12, and first and second separators 14, 16 for supporting the fuel cell unit 12 interposed therebetween. A plurality of sets of these components are optionally stacked with each other. The fuel cell unit 12 includes a solid polymer ion exchange membrane 18, and a cathode electrode 20 and an anode electrode 22 which are arranged with the ion exchange membrane 18 intervening therebetween. First and second gas diffusion layers 24, 26, each of which is composed of, for example, porous carbon paper as a porous layer, are arranged for the cathode electrode 20 and the anode electrode 22.

First and second gaskets 28, 30 are provided on both sides of the fuel cell unit 12. The first gasket 28 has a large opening 32 for accommodating the cathode electrode 20 and the first gas diffusion layer 24. On the other hand, the second gasket 30 has a large opening 34 for accommodating the anode electrode 22 and the second gas diffusion layer 26. The fuel cell unit 12 and the first and second gaskets 28, 30 are interposed between the first and second separators 14, 16. A third gasket 35 is arranged for the second separator 16.

The first separator 14 is provided, at its upper portions at the both ends in the lateral direction, with communication holes of a fuel gas inlet 36a for allowing a fuel gas such as hydrogen gas to pass therethrough, and an oxygen-containing gas inlet 38a for allowing an oxygen-containing gas as oxygen gas or air to pass therethrough.

The first separator 14 is provided, at its central portions at the both ends in the lateral direction, with communication holes of a cooling medium inlet 40a for allowing a cooling medium such as pure water, ethylene glycol, and oil to pass therethrough, and a cooling medium outlet 40b for allowing the cooling medium after being used to pass therethrough. The first separator 14 is provided, at its lower portions at the both ends in the lateral direction, with a fuel gas outlet 36b for allowing the fuel gas to pass therethrough, and an oxygen-containing gas outlet 38b for allowing the oxygen-containing gas to pass therethrough so that the fuel gas outlet 36b and the oxygen-containing gas outlet 38b are disposed at diagonal positions with respect to the fuel gas inlet 36a and the oxygen-containing gas inlet 38a respectively.

A plurality of, for example, six of mutually independent first oxygen-containing gas flow passage grooves (gas flow passages) 42, are provided closely to the oxygen-containing gas inlet 38a so that they are directed in the direction of the gravity while meandering in the horizontal direction on the surface 14a opposed to the cathode electrode 20 of the first separator 14. The first oxygen-containing gas flow passage grooves 42 are merged into three second oxygen-containing gas flow passage grooves (gas flow passages) 44. The second oxygen-containing gas flow passage grooves 44 terminate at positions close to the oxygen-containing gas outlet 38b.

The first separator 14 is provided with first oxygen-containing gas connecting flow passages 46 which penetrate through the first separator 14, which communicate at first ends with the oxygen-containing gas inlet 38a on the surface 14b on the side opposite to the surface 14a, and which communicate at second ends with the first oxygen-containing gas flow passage grooves 42 on the side of the surface 14a, and second oxygen-containing gas connecting flow passages 48 which communicate at first ends with the oxygen-containing gas outlet 38b on the side of the surface 14b and which communicate at second ends with the second oxygen-containing gas flow passage grooves 44 on the side of the surface 14a.

Figure 3:
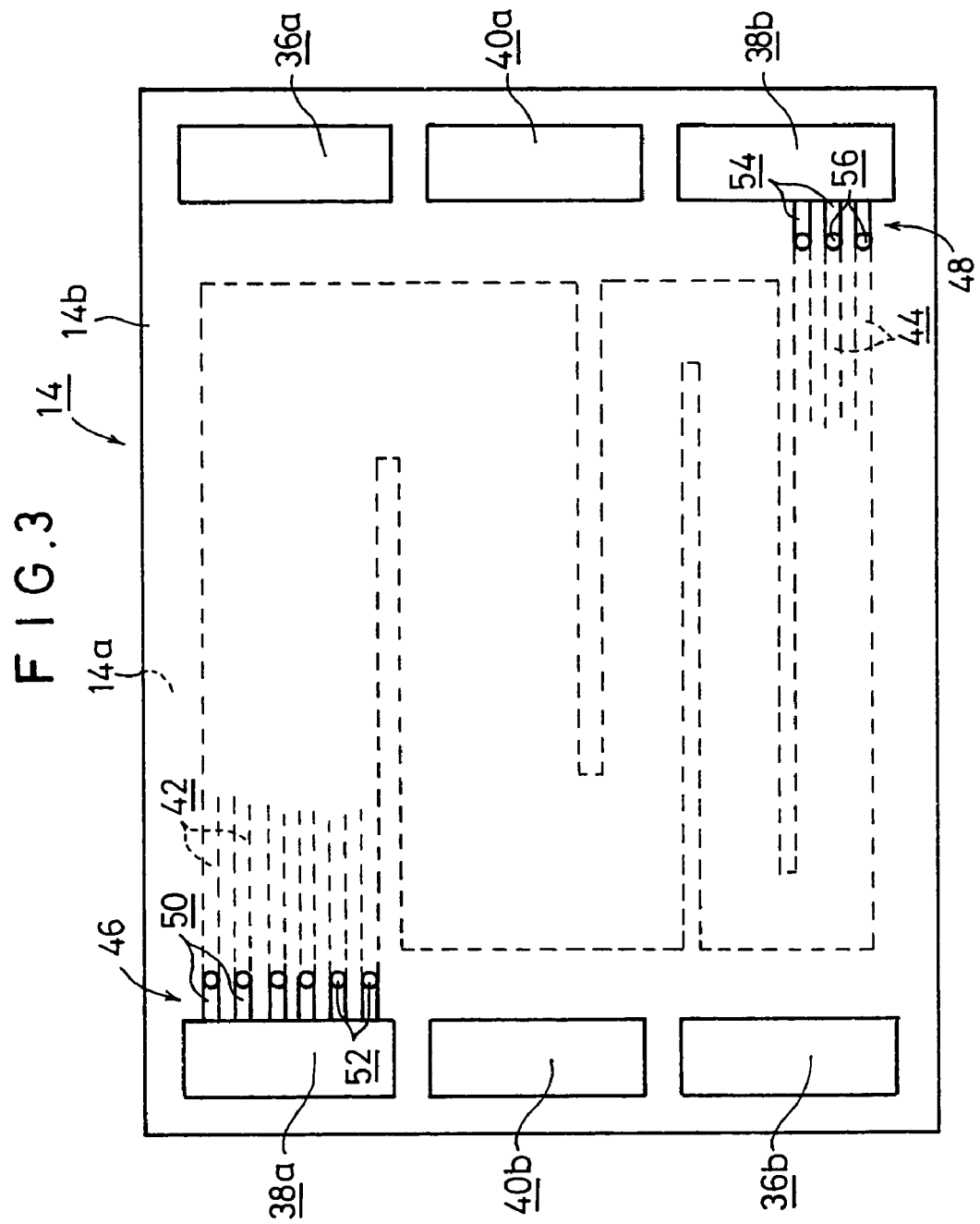
FIG. 3 is a front view illustrating a first separator of the fuel cell.

As shown in FIGS. 2 and 3, the first oxygen-containing gas connecting flow passages 46 include six flow passage grooves 50 which are provided on the side of the surface 14b and which are separated from each other by predetermined spacing distances corresponding to the first oxygen-containing gas flow passage grooves 42. First ends of the flow passage grooves 50 communicate with the oxygen-containing gas inlet 38a. The flow passage grooves 50 are formed up to a predetermined depth on the side of the surface 14b, and second ends thereof communicate with through-holes 52 respectively. The through-holes 52 penetrate through the first separator 14, and they communicate with the first oxygen-containing gas flow passage grooves 42 on the side of the surface 14a. R-sections 53 are provided at wall portions of the through-holes 52, corresponding to the portions of communication with the oxygen-containing gas flow passage grooves 42. Alternatively, chamfered sections may be provided in place of the R-sections 53.

Similarly, the second oxygen-containing gas connecting flow passages 48 are provided with three flow passage grooves 54 which are provided on the side of the surface 14b and which communicate with the oxygen-containing gas outlet 38b at the first end side to correspond to the second oxygen-containing gas flow passage grooves 44, and three through-holes 56 which communicate with the flow passage grooves 54 on the second end side and which penetrate through the first separator 14 to communicate with the second oxygen-containing gas flow passage grooves 44 on the side of the surface 14a.

Figure 4:
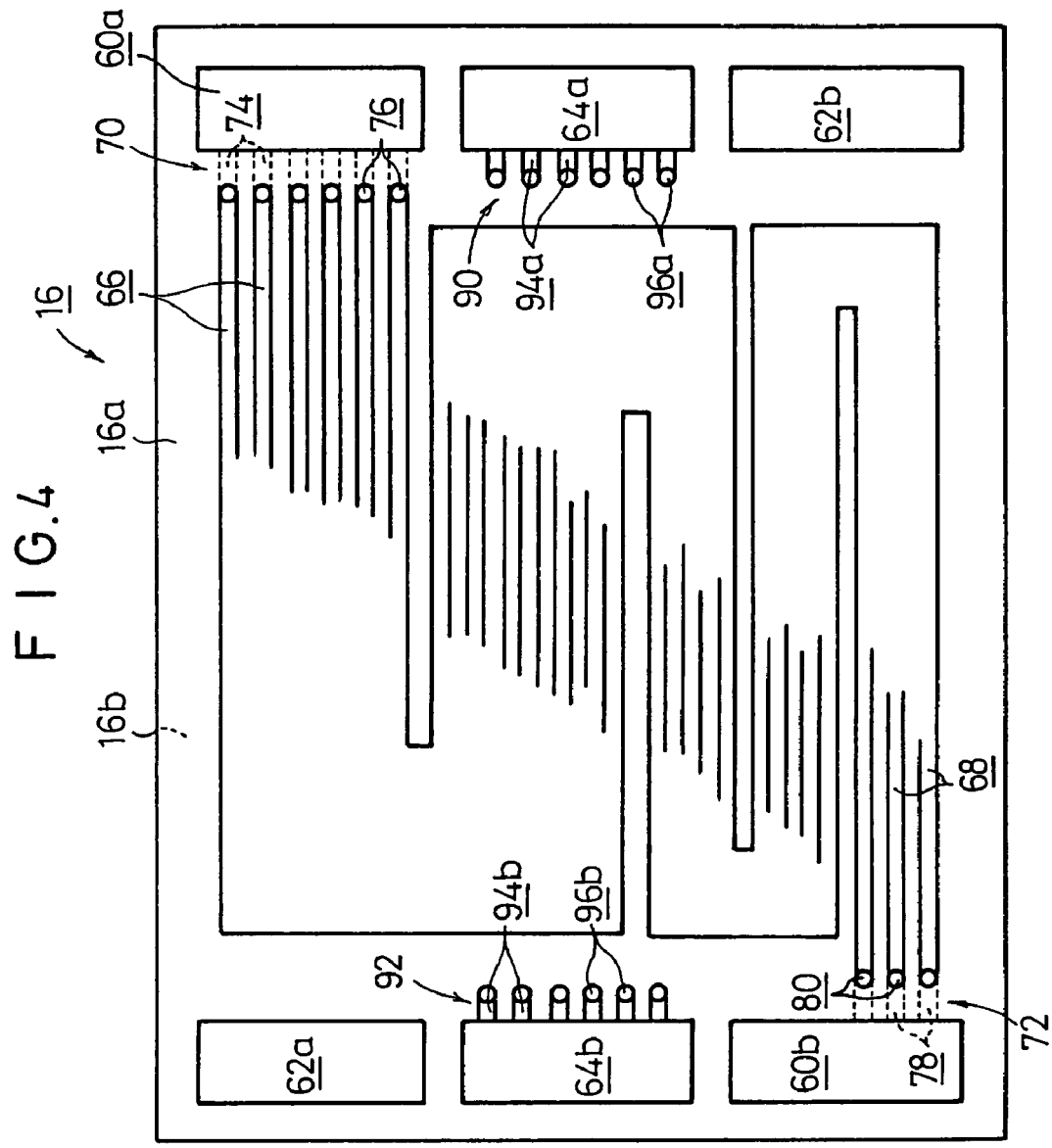
FIG. 4 is a front view illustrating a first surface of a second separator of the fuel cell.
Figure 5:
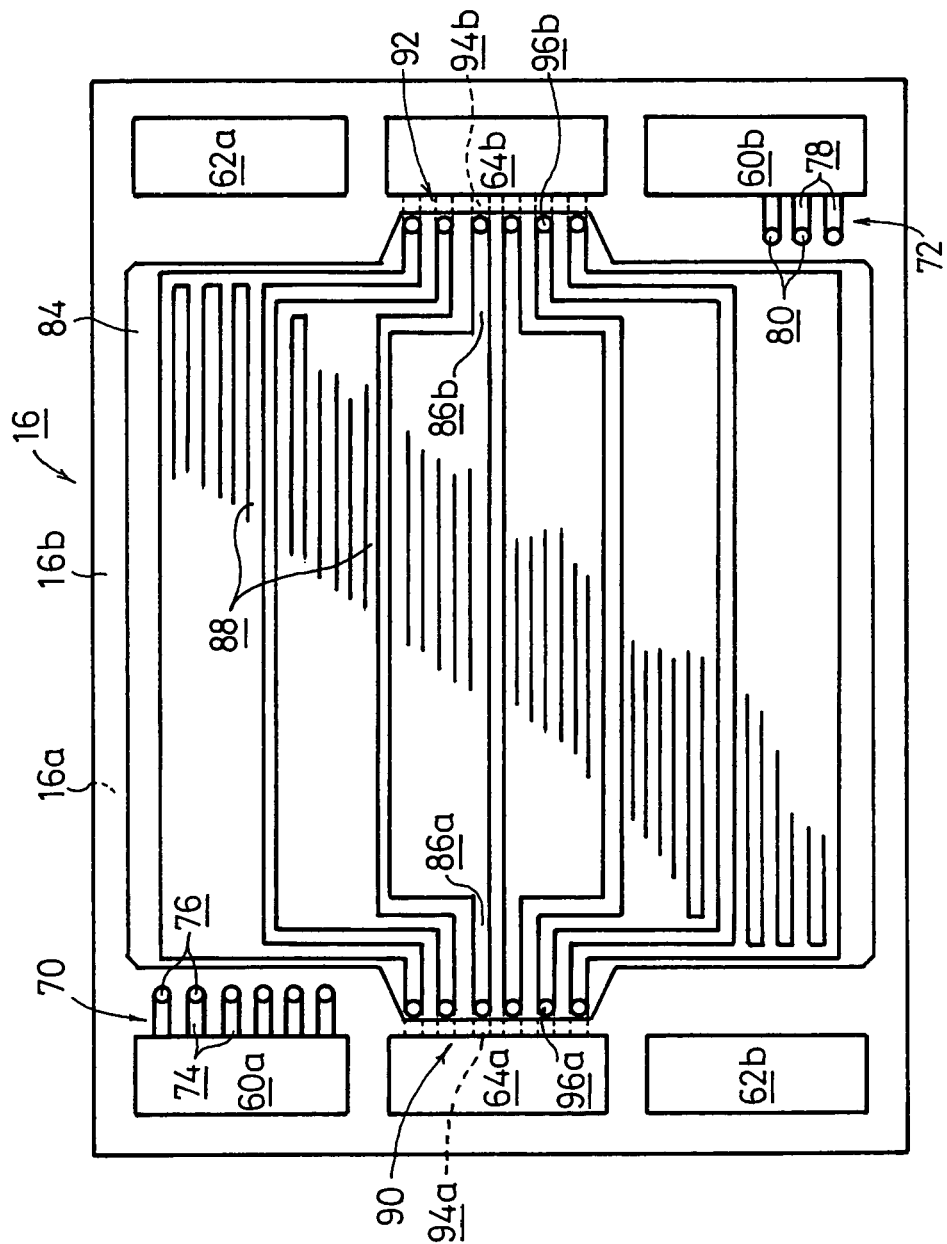
FIG. 5 is a front view illustrating a second surface of the second separator.

As shown in FIGS. 1, 4, and 5, the second separator 16 is provided, at upper portions at the both ends in the lateral direction, with communication holes of a fuel gas inlet 60a and an oxygen-containing gas inlet 62a. The second separator 16 is provided, at central portions at the both ends in the lateral direction, with communication holes of a cooling medium inlet 64a and a cooling medium outlet 64b. The second separator 16 is provided, at lower portions at the both ends in the lateral direction, with communication holes of a fuel gas outlet 60b and an oxygen-containing gas outlet 62b so that the fuel gas outlet 60b and the oxygen-containing gas outlet 62b are disposed at diagonal positions with respect to the fuel gas inlet 60a and the oxygen-containing gas inlet 62a.

As shown in FIG. 4, a plurality of, for example, six of first fuel gas flow passage grooves (gas flow passages) 66 are formed closely to the fuel gas inlet 60a on the surface 16a of the second separator 16. The first fuel gas flow passage grooves 66 extend in the direction of the gravity while meandering in the horizontal direction, and they are merged into three second fuel gas flow passage grooves (gas flow passages) 68. The second fuel gas flow passage grooves 68 terminate at positions close to the fuel gas outlet 60b.

The second separator 16 is provided with first fuel gas connecting flow passages 70 which make communication between the fuel gas inlet 60a and the first fuel gas flow passage grooves 66 from the side of the surface 16b, and second fuel gas connecting flow passages 72 which make communication between the fuel gas outlet 60b and the second fuel gas flow passage grooves 68 from the side of the surface 16b. As shown in FIGS. 2, 4, and 5, the first fuel gas connecting flow passages 70 are provided with six flow passage grooves 74 corresponding to the first fuel gas flow passage grooves 66, which are disposed on the side of the surface 16b and communicate with the fuel gas inlet 60a at first ends, and through-holes 76 which communicate with second ends of the flow passage grooves 74 and which penetrate through the second separator 16 to make communication with the first fuel gas flow passage grooves 66.

In the same manner as the first fuel gas connecting flow passages 70, the second fuel gas connecting flow passages 72 are provided with three flow passage grooves 78 which are provided on the side of the surface 16b to make communication with the fuel gas outlet 60b, and through-holes 80 which penetrate through the second separator 16 to make communication between the flow passage grooves 78 and the second fuel gas flow passage grooves 68 respectively.

As shown in FIGS. 2 and 5, a step section 84, which corresponds to an opening 82 of the third gasket 35, is formed on the surface 16b of the second separator 16. A plurality of main flow passage grooves 86a, 86b of the cooling medium flow passage are formed closely to the cooling medium inlet 64a and the cooling medium outlet 64b in the step section 84. A plurality of branched flow passage grooves 88 extend in the horizontal direction between the main flow passage grooves 86a, 86b.

The second separator 16 is provided with first cooling medium connecting flow passages 90 which make communication between the cooling medium inlet 64a and the main flow passage grooves 86a, and second cooling medium connecting flow passages 92 which make communication between the cooling medium outlet 64b and the main flow passage grooves 86b. As shown in FIGS. 4 and 5, the first and second cooling medium connecting flow passages 90, 92 are provided with a plurality of flow passage grooves 94a, 94b which are provided on the side of the surface 16a to make communication with the cooling medium inlet 64a and the cooling medium outlet 64b, and through-holes 96a, 96b which penetrate through the second separator 16 to make communication between the flow passage grooves 94a, 94b and the main flow passage grooves 86a, 86b.

Figure 6:
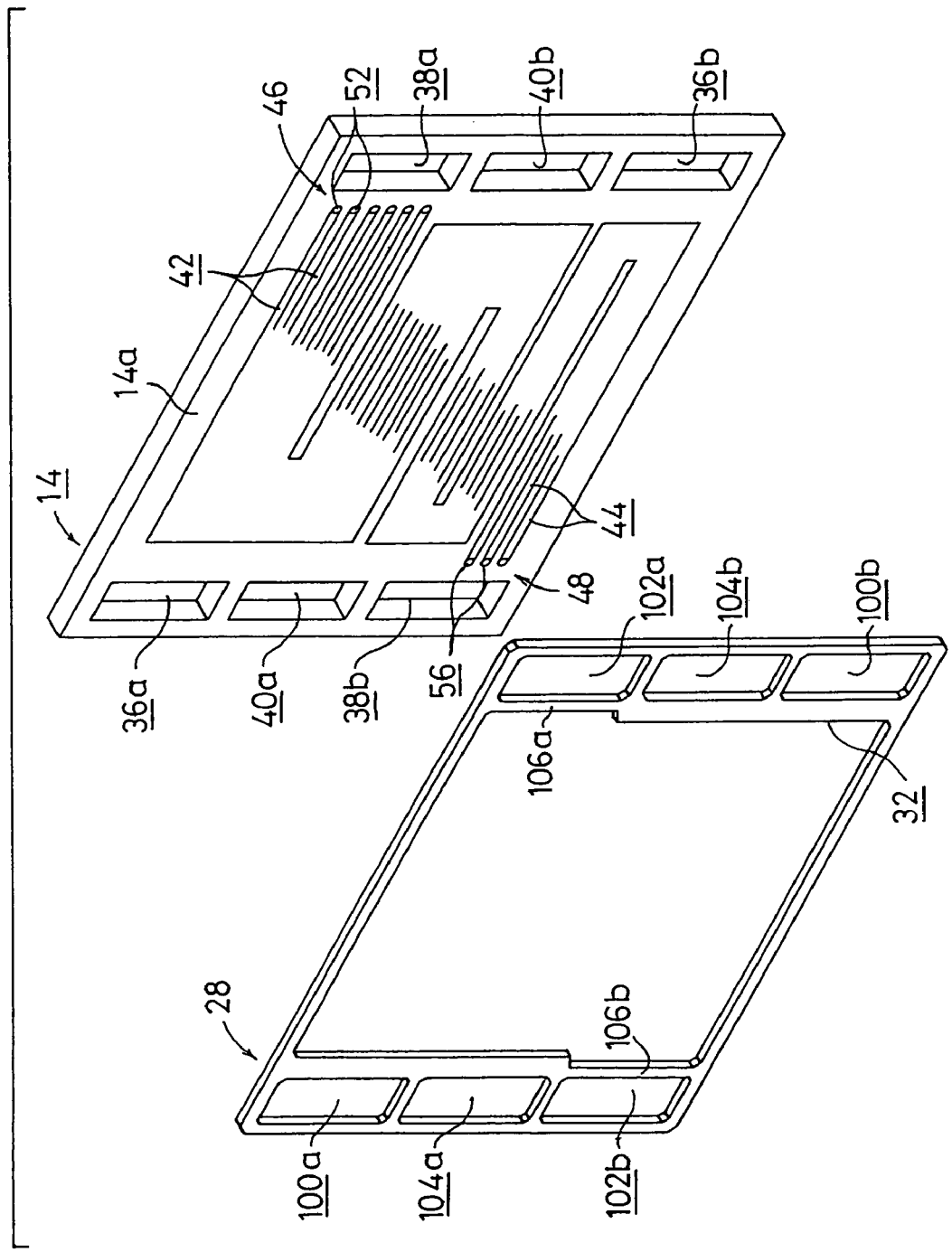
FIG. 6 is a perspective view illustrating the first separator and a first gasket.

As shown in FIG. 6, the first gasket 28 is provided, at both end portions in the lateral direction, with a fuel gas inlet 10a, an oxygen-containing gas inlet 102a, a cooling medium inlet 104a, a cooling medium outlet 104b, a fuel gas outlet 10b, and an oxygen-containing gas outlet 102b. The first gasket 28 is provided with narrow-width sections 106a, 106b which are arranged corresponding to portions between the oxygen-containing gas inlet 38a and the through-hole 52 and between the oxygen-containing gas outlet 38b and the through-hole 56 on the surface 14a of the first separator 14.

Figure 7:
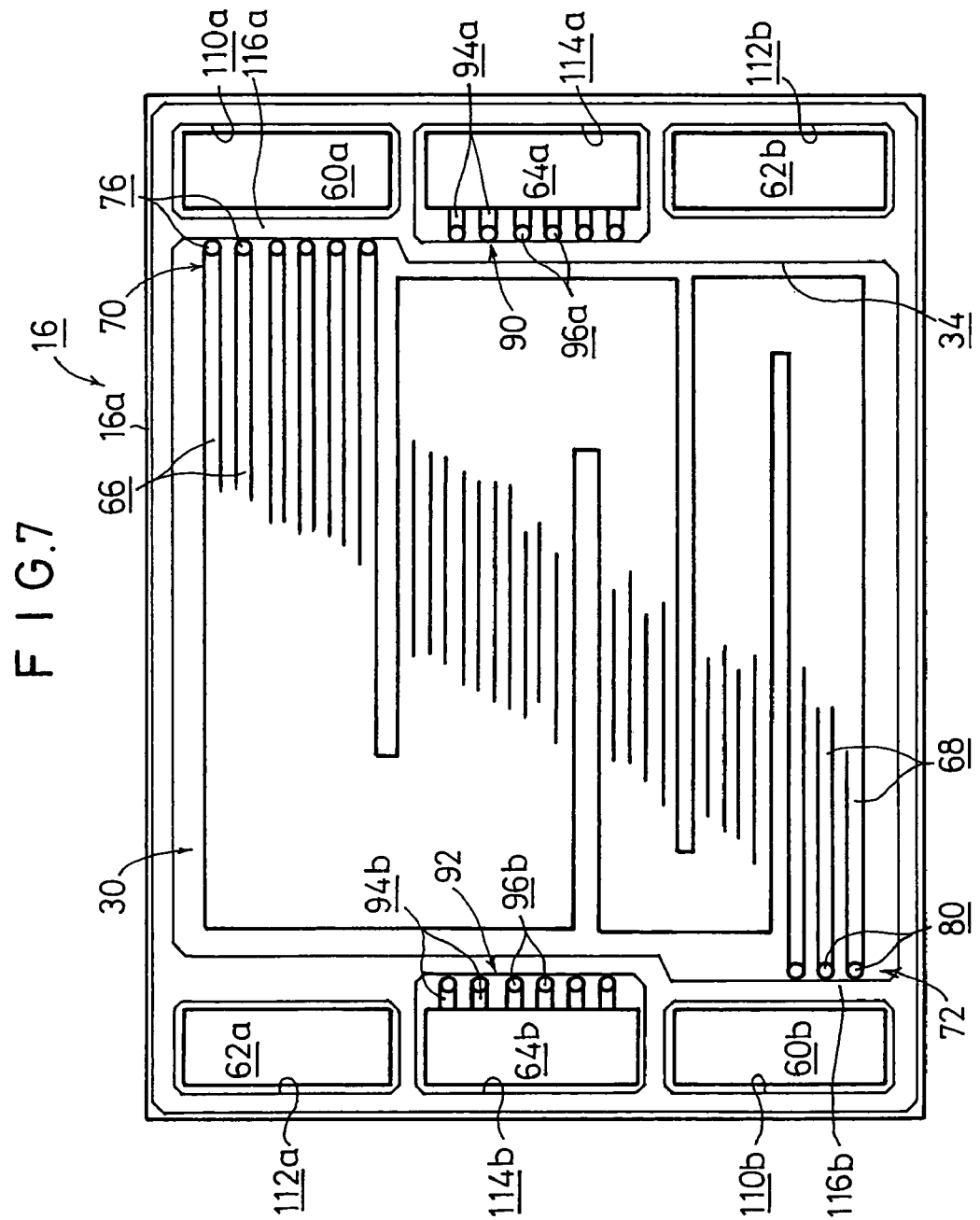
FIG. 7 is a front view illustrating a state in which a second gasket is arranged on the second separator.

As shown in FIGS. 1 and 7, the second gasket 30 is provided, at both end portions in the lateral direction, with a fuel gas inlet 110a, an oxygen-containing gas inlet 112a, a cooling medium inlet 114a, a cooling medium outlet 114b, a fuel gas outlet 110b, and an oxygen-containing gas outlet 112b. The cooling medium inlet 114a and the cooling medium outlet 114b are designed to have sizes sufficient to accommodate the first and second cooling medium connecting flow passages 90, 92. The second gasket 30 is formed with narrow-width sections 116a, 116b corresponding to portions between the through-holes 76, 80 of the first and second fuel gas connecting flow passages 70, 72 and the fuel gas inlet 60a and the fuel gas outlet 60b.

As shown in FIG. 1, the third gasket 35 is provided, at both end portions in the lateral direction, with a fuel gas inlet 120a, an oxygen-containing gas inlet 122a, a cooling medium inlet 124a, a cooling medium outlet 124b, a fuel gas outlet 120b, and an oxygen-containing gas outlet 122b. The third gasket 35 is formed with narrow-width sections 126a, 126b corresponding to portions between the step section 84 provided on the surface 16a of the second separator 16 and the cooling medium inlet 64a and the cooling medium outlet 64b. Width dimensions of the fuel gas inlet 120a and the fuel gas outlet 120b are designed to be large, in order to accommodate the first and second fuel gas connecting flow passages 70, 72 provided for the second separator 16.

The operation of the fuel cell 10 according to the first embodiment constructed as described above will be explained below.

The fuel gas, for example, the gas containing hydrogen obtained by reforming hydrocarbon is supplied to the inside of the fuel cell 10, and the air or the gas containing oxygen as the oxygen-containing gas (hereinafter simply referred to as "air") is supplied thereto. Further, the cooling medium is supplied in order to cool the power-generating surface of the fuel cell unit 12. As shown in FIGS. 2 and 5, the fuel gas, which is supplied to the inside of the fuel cell 10, is introduced into the flow passage grooves 74 which constitute the first fuel gas connecting flow passages 70. The fuel gas is moved from the side of the surface 16b to the side of the surface 16a via the through-holes 76 communicating with the flow passage grooves 74. The fuel gas is supplied to the first fuel gas flow passage grooves 66 which are formed on the side of the surface 16a.

As shown in FIG. 4, the fuel gas, which is supplied to the first fuel gas flow passage grooves 66, is moved in the direction of the gravity while meandering in the horizontal direction along the surface 16a of the second separator 16. During this process, the hydrogen gas in the fuel gas passes through the second gas diffusion layer 26, and it is supplied to the anode electrode 22 of the fuel cell unit 12 (see FIG. 2). The fuel gas, which is not used, is supplied to the anode electrode 22 while being moved along the first fuel gas flow passage grooves 66. On the other hand, the fuel gas, which is not used, passes through the second fuel gas flow passage grooves 68, and it is introduced into the through-holes 80 which constitute the second fuel gas connecting flow passages 72. The fuel gas is moved toward the side of the surface 16b, and then it is discharged from the flow passage grooves 78 to the fuel gas outlet 60b.

As shown in FIG. 2, the air, which is supplied to the inside of the fuel cell 10, is introduced into the oxygen-containing gas inlet 38a of the first separator 14, and it is introduced into the first oxygen-containing gas flow passage grooves 42 via the first oxygen-containing gas connecting flow passages 46 which communicate with the oxygen-containing gas inlet 38a. Specifically, as shown in FIG. 3, when the air is introduced into the flow passage grooves 50 which are formed on the side of the surface 14b of the first separator 14, then the air penetrates through the first separator 14 via the through-holes 52 communicating with the flow passage grooves 50, and it is introduced into the first oxygen-containing gas flow passage grooves 42 which are formed on the side of the surface 14a.

As shown in FIG. 6, the air, which is supplied to the first oxygen-containing gas flow passage grooves 42, is moved in the direction of the gravity while meandering in the horizontal direction. During this process, the oxygen gas in the air is supplied from the first gas diffusion layer 24 to the cathode electrode 20 (see FIG. 2). On the other hand, the air, which is not used, passes through the second oxygen-containing gas flow passage grooves 44, and it is discharged from the second oxygen-containing gas connecting flow passages 48 to the oxygen-containing gas outlet 38b. Accordingly, the electric power is generated in the fuel cell unit 12. For example, the electric power is supplied to an unillustrated motor.

Further, the cooling medium, which is supplied to the inside of the fuel cell 10, is introduced into the cooling medium inlet 64a of the second separator 16, and then it is supplied to the main flow passage grooves 86a on the side of the surface 16b via the through-holes 96a from the flow passage grooves 94a which constitute the first cooling medium connecting flow passages 90 as shown in FIGS. 4 and 5. The cooling medium passes through the plurality of branched flow passage grooves 88 which are branched from the main flow passage grooves 86*a* to cool the power-generating surface of the fuel cell unit 12, followed by being merged into the main flow passage grooves 86*b*. The cooling medium after the use passes through the through-holes 96*b* which constitute the second cooling medium connecting flow passages 92, and it is introduced into the flow passage grooves 94*b* on the side of the surface 16*a*. The cooling medium is discharged from the cooling medium outlet 64*b*.

In the first embodiment based on the arrangement as described above, as shown in FIG. 4, the first and second fuel gas flow passage grooves 66, 68, which terminate at the positions close to the fuel gas inlet 60*a* and the fuel gas outlet 60*b*, are formed on the surface 16*a* of the second separator 16. The first and second fuel gas flow passage grooves 66, 68 communicate with the flow passage grooves 74, 78 which are provided on the side of the surface 16*b*, via the through-holes 76, 80. The flow passage grooves 74, 78 communicate with the fuel gas inlet 60*a* and the fuel gas outlet 60*b*.

Accordingly, it is unnecessary to provide any thin plate-shaped cover to be flush with the surface 16*a* on the upper side of the grooves, unlike a case in which grooves for making communication between the fuel gas inlet 60*a* and the first fuel gas flow passage grooves 66 are provided on the side of the surface 16*a* of the second separator 16. The second gasket 30 can be directly superimposed on the surface 16*a* (see FIG. 7).

Accordingly, it is unnecessary to perform any sticking step unlike the case in which the cover is used. Further, for example, the fuel gas is not leaked, which would be otherwise caused by the loss of the cover, or no tightening deficiency takes place, which would be otherwise caused by the difference in thickness between the cover and the second separator 16. Therefore, the following effect is obtained. That is, the satisfactory sealing performance is ensured with the simple structure. It is possible to simplify the assembling step. Further, it is easy to simplify the entire fuel cell 10 and realize the thin-walled fuel cell 10.

In the first embodiment, the fuel gas inlet 60*a* and the fuel gas outlet 60*b*, which serve as the communication holes, are provided at the outer circumferential edge portions of the surface 16*a* of the second separator 16. The first and second fuel gas connecting flow passages 70, 72, which serve to communicate the fuel gas inlet 60*a* and the fuel gas outlet 60*b* with the first and second fuel gas flow passage grooves 66, 68, are provided closely to the fuel gas inlet 60*a* and the fuel gas outlet 60*b*. Accordingly, the lengths of the flow passage grooves 74, 78 which communicate the through-holes 76, 80 of the first and second fuel gas connecting flow passages 70, 72 with the fuel gas inlet 60*a* and the fuel gas outlet 60*b* are shortened as much as possible. An advantage is obtained such that the pressure loss can be greatly reduced.

With the through-holes 76, 80 and the flow passage grooves 74, 78, and the first and second fuel gas flow passage grooves 66, 68 provided on the surface 16*a*, a large amount of the fuel gas can smoothly flow along the surface 16*a*. The operation at a high current density can be easily performed.

On the other hand, the first and second cooling medium connecting flow passages 90, 92 are provided for the cooling medium inlet 64*a* and the cooling medium outlet 64*b* of the second separator 16. As for the first separator 14, the first and second oxygen-containing gas connecting flow passages 46, 48 are provided for the oxygen-containing gas inlet 38*a* and the oxygen-containing gas outlet 38*b*. Accordingly, it is unnecessary to provide the thin plate-shaped cover, and the number of parts is reduced all at once. It is possible to realize the thin-walled structure of the entire fuel cell 10.

Further, the cooling medium inlet 64*a* and the cooling medium outlet 64*b* are provided at the outer circumferential edge portions of the second separator 16. As shown in FIG. 5, the main flow passage grooves 68*a*, 68*b* and the branched flow passage grooves 88 are formed along the entire surface 16*b* on the surface 16*b* of the second separator 16. Therefore, it is possible to reliably cool the entire interior of the surface 16*b*. An advantage is obtained such that the cooling efficiency is effectively improved. Further, for example, when pure water, ethylene glycol, or oil is used as the cooling medium, the cooling ability is considerably enhanced as compared with the air-cooling. Especially, the operation at a high current density can be easily performed.

Figure 8:
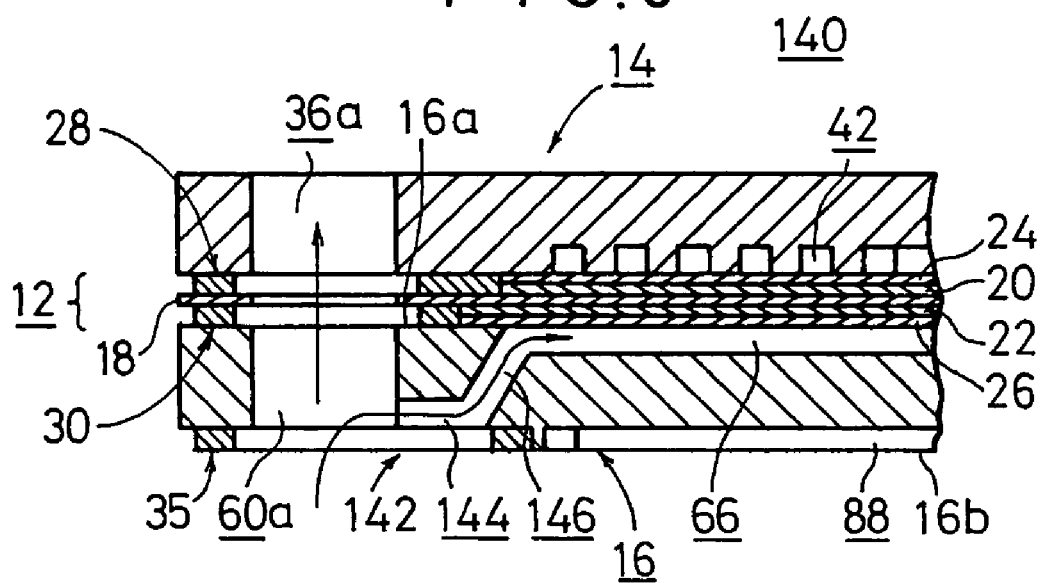
FIG. 8 is a partial vertical sectional view illustrating a fuel cell according to a second embodiment of the present invention.

FIG. 8 is a partial vertical sectional view illustrating a fuel cell 140 according to a second embodiment of the present invention. The same constitutive components as those of the fuel cell 10 according to the first embodiment are designated by the same reference numerals, detailed explanation of which will be omitted.

In the fuel cell 140, the second separator 16 is provided with first fuel gas connecting flow passages 142 for making communication between the fuel gas inlet 60*a* and the first fuel gas flow passage grooves 66. The first fuel gas connecting flow passages 142 are provided with flow passage grooves 144 which are formed on the side of the surface 16*b* of the second separator 16, and inclined through-holes 146 for communicating the flow passage grooves 144 with the first fuel gas flow passage grooves 66 on the side of the surface 16*a*. The inclined through-holes 146 are provided so that they are inclined inwardly with respect to the thickness direction of the second separator 16.

In the second embodiment constructed as described above, the fuel gas, which is supplied to the fuel gas inlet 60*a*, is supplied to the first fuel gas flow passage grooves 66 via the inclined through-holes 146 from the flow passage grooves 144 which constitute the first fuel gas connecting flow passages 142. During this process, the fuel gas is introduced more smoothly and reliably from the flow passage grooves 144 to the first fuel gas flow passage grooves 66 along the inclination of the inclined through-holes 146. An advantage is obtained such that the pressure loss can be effectively reduced.

Figure 9:
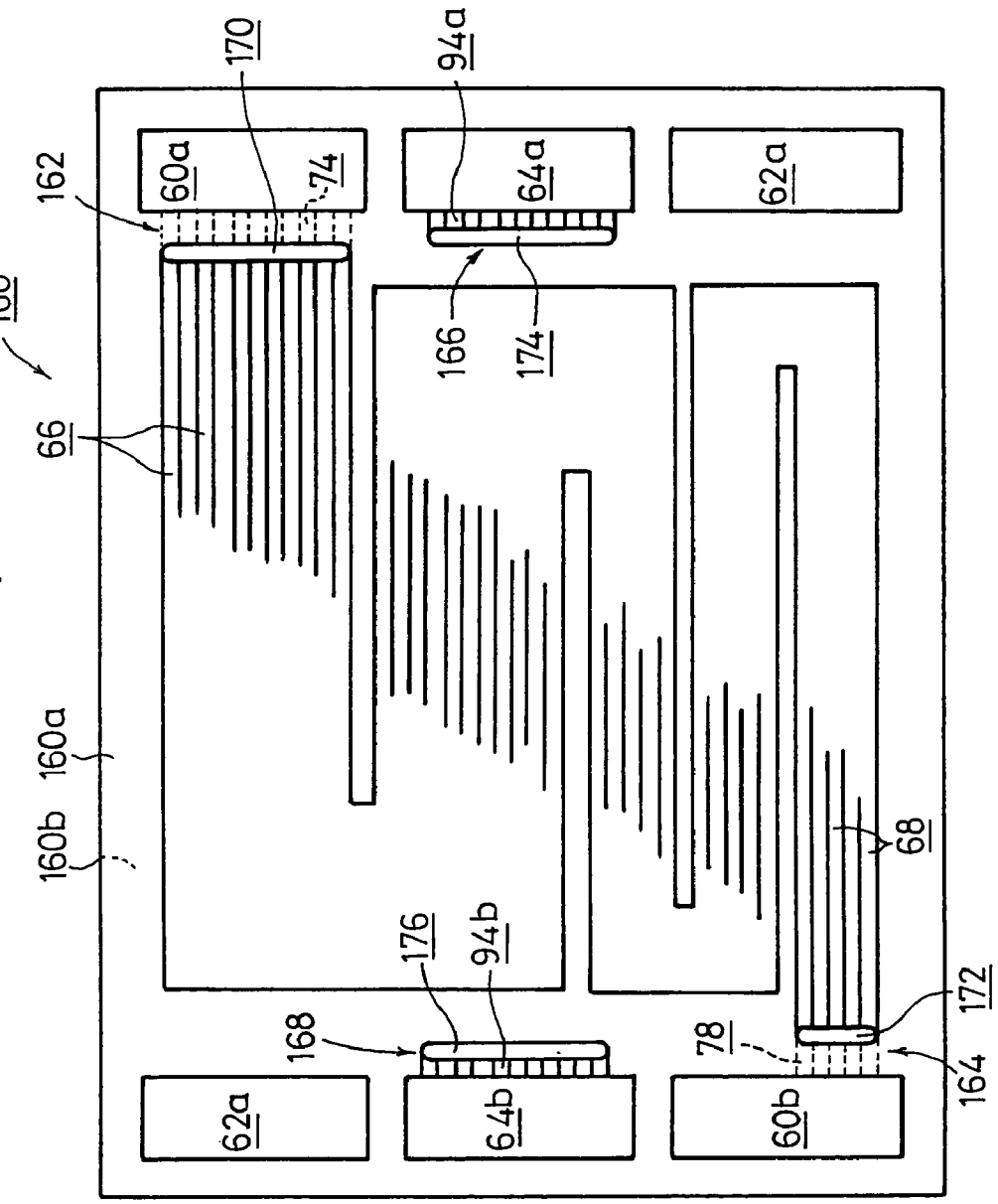
FIG. 9 is a front view illustrating a surface of a second separator of a fuel cell according to a third embodiment of the present invention.

FIG. 9 is a front view illustrating a second separator 160 of a fuel cell according to a third embodiment of the present invention. The same constitutive components as those of the second separator 16 of the fuel cell 10 according to the first embodiment are designated by the same reference numerals, detailed explanation of which will be omitted.

The second separator 160 is provided with first and second fuel gas connecting flow passages 162, 164 for communicating, from the side of the surface 160*b*, the fuel gas inlet 60*a* and the fuel gas outlet 60*b* with the first and second fuel gas flow passage grooves 66, 68 which are formed on the side of the surface 160*a*, and first and second cooling medium connecting flow passages 166, 168 for communicating the cooling medium inlet 64*a* and the cooling medium outlet 64*b* with unillustrated cooling medium flow passage grooves which are provided on the side of the surface 160*b*.

The first and second fuel gas connecting flow passages 162, 164 are provided with long holes 170, 172 which integrally communicate with the flow passage grooves 74, 78 provided on the side of the surface 160*b* and which penetrate through the second separator 160. Similarly, the first and second cooling medium connecting flow passages 166, 168 are provided with long holes 174, 176 which integrally communicate with the flow passage grooves 94a, 94b and which are provided to penetrate through the second separator 160.

In the third embodiment constructed as described above, for example, when the fuel gas supplied to the fuel gas inlet 60a is introduced into the flow passage grooves 74, then the fuel gas is integrally introduced into the long holes 170 to be moved from the side of the surface 160b to the side of the surface 160a, and it is introduced into the first fuel gas flow passage grooves 66. Accordingly, the same effect as that of the first and second embodiments is obtained as follows. That is, for example, it is unnecessary to use, for example, the thin plate-shaped cover for closing the groove, for the surfaces 160a, 160b of the second separator 160. The number of parts is reduced all at once. It is possible to realize the thin-walled construction with the simple structure.

In the third embodiment, the first and second fuel gas connecting flow passages 162, 164 are provided with the long holes 170, 172 which integrally communicate with the flow passage grooves 74, 78 and which penetrate through the second separator 160. An advantage is obtained such that it is possible to effectively reduce the pressure loss brought about when the fuel gas passes through the long holes 170, 172. Similarly, the second separator 160 is provided with the long holes 174, 176 for allowing the cooling medium to pass therethrough. It is easy to reduce the pressure loss.

Further, the long holes 170, 172, 174, 176 may be formed to penetrate through the second separator 160. Therefore, the following effect is obtained. That is, the operation for producing the second separator 160 is further simplified, and it is possible to economically produce the second separator 160.

Figure 10:
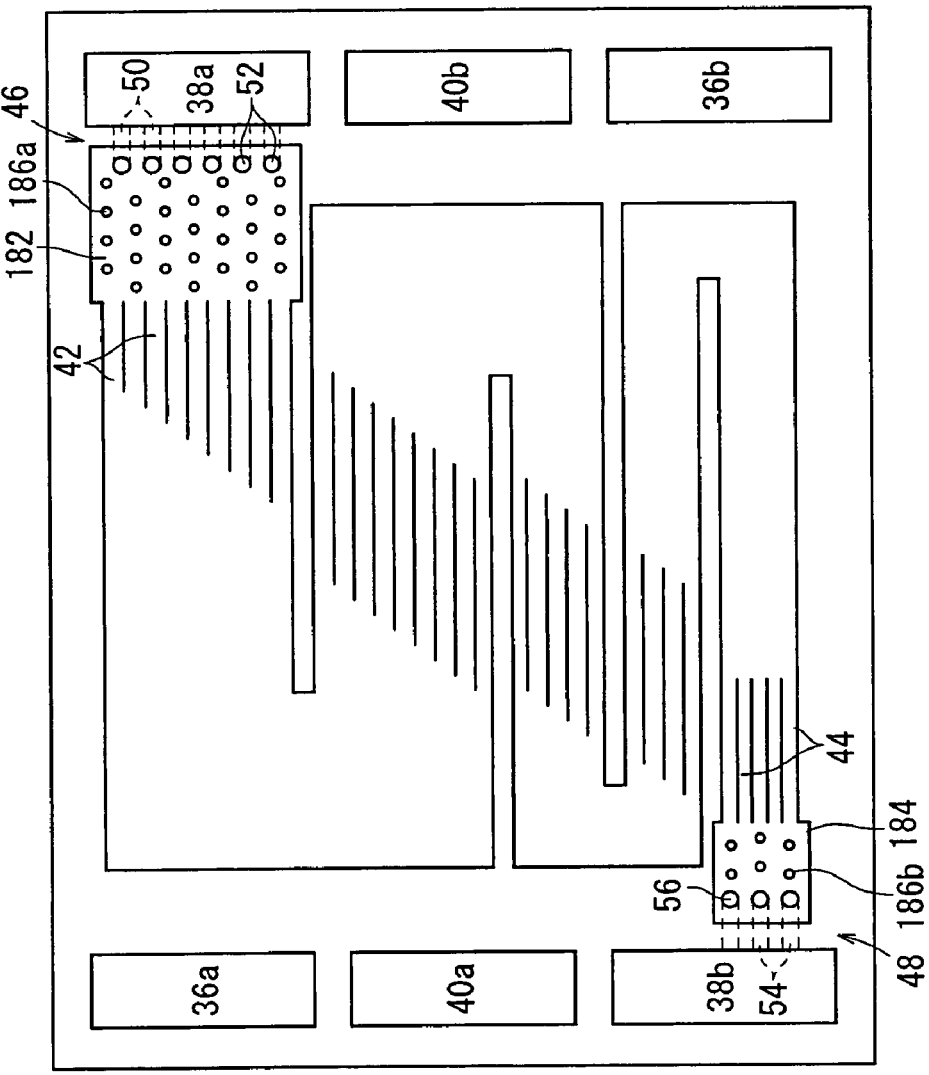
FIG. 10 is a front view illustrating a first separator of a fuel cell according to a fourth embodiment of the present invention.

FIG. 10 is a front view illustrating a first separator 180 of a fuel cell according to a fourth embodiment of the present invention. Though not illustrated, the fuel cell has a second separator having the same structure with the first separator 180, and description of the second separator is omitted. The constituent elements that are identical to the first separator 14 of the fuel cell 10 according to the first embodiment are labeled with the same reference numeral, and description thereof is omitted. Similarly, in a fifth embodiment as described later, the constituent elements that are identical to the first separator 14 of the fuel cell 10 according to the first embodiment are labeled with the same reference numeral, and description thereof is omitted.

The first separator 180 includes a first buffer 182 adjacent to an oxygen-containing gas inlet 38a of a first oxygen-containing gas flow passage grooves 42, and a second buffer 184 adjacent to an oxygen-containing gas outlet 38b of a second oxygen-containing gas flow passage grooves 44.

Figure 11:
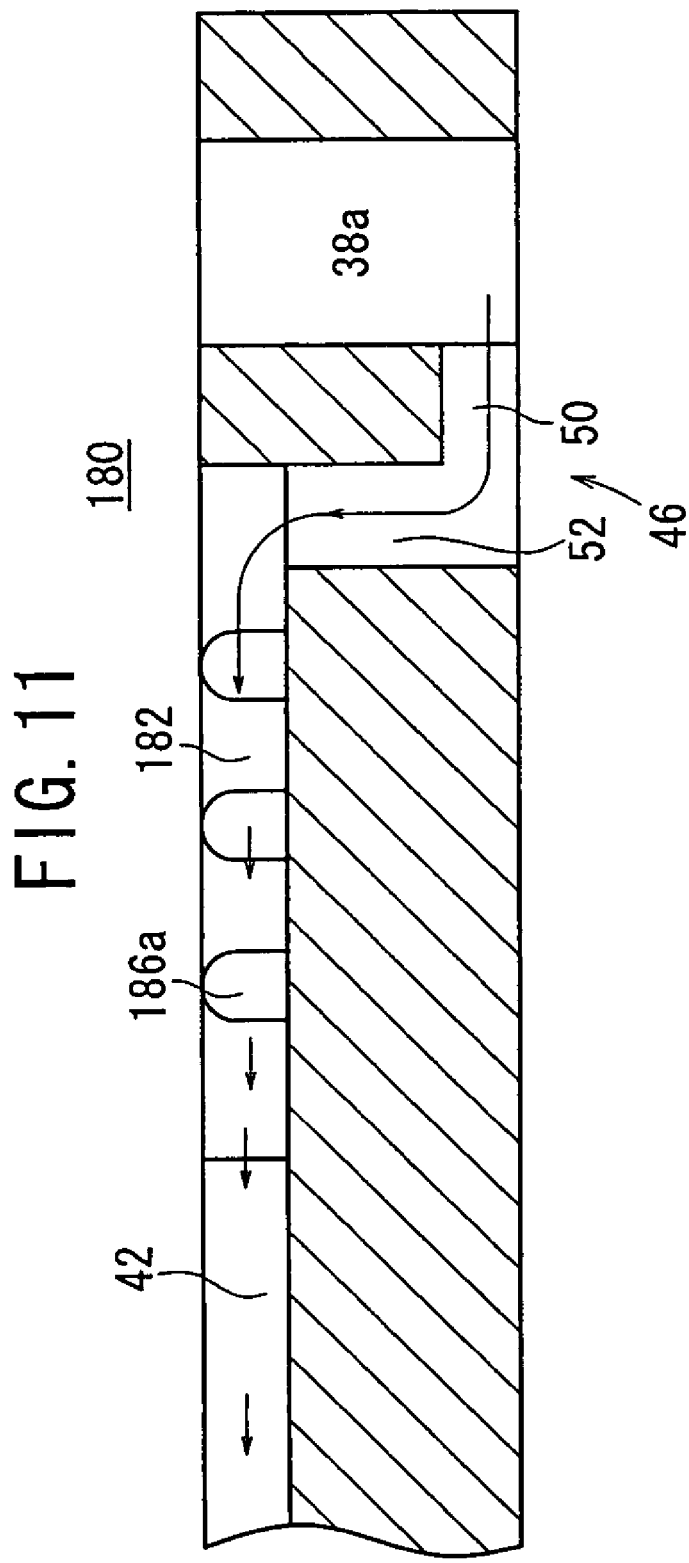
FIG. 11 is an enlarged partial sectional view illustrating the first separator.

As shown in FIGS. 10 and 11, the first buffer 182 includes a plurality of columnar protrusions 186a. Through-holes 52 are formed in the first buffer 182. As shown in FIG. 10, the second buffer 184 includes a plurality of columnar protrusions 186b. Through holes 56 are formed in the second buffer 184.

In the fourth embodiment, the oxygen-containing gas is initially supplied to the through-holes 52 of the first buffer 182. Then, the oxygen-containing gas is supplied from the first buffer 182 uniformly to each of the oxygen-containing gas flow passage grooves 42. The oxygen-containing gas used in the reaction flows from the second oxygen-containing gas flow passage grooves 44 to the second buffer 184. Then, the oxygen-containing gas is discharged smoothly from the through-holes 56 of the second buffer 184 to the oxygen-containing gas outlet 38b.

In the present embodiment, the first and second buffers 182, 184 have the columnar protrusions 186a, 186b. However, the protrusions 186a, 186b can be formed in any suitable shape, such as a rectangular bar shape, or an oval bar shape. In one embodiment, only one of the buffers 182, 184 may be provided.

Figure 12:
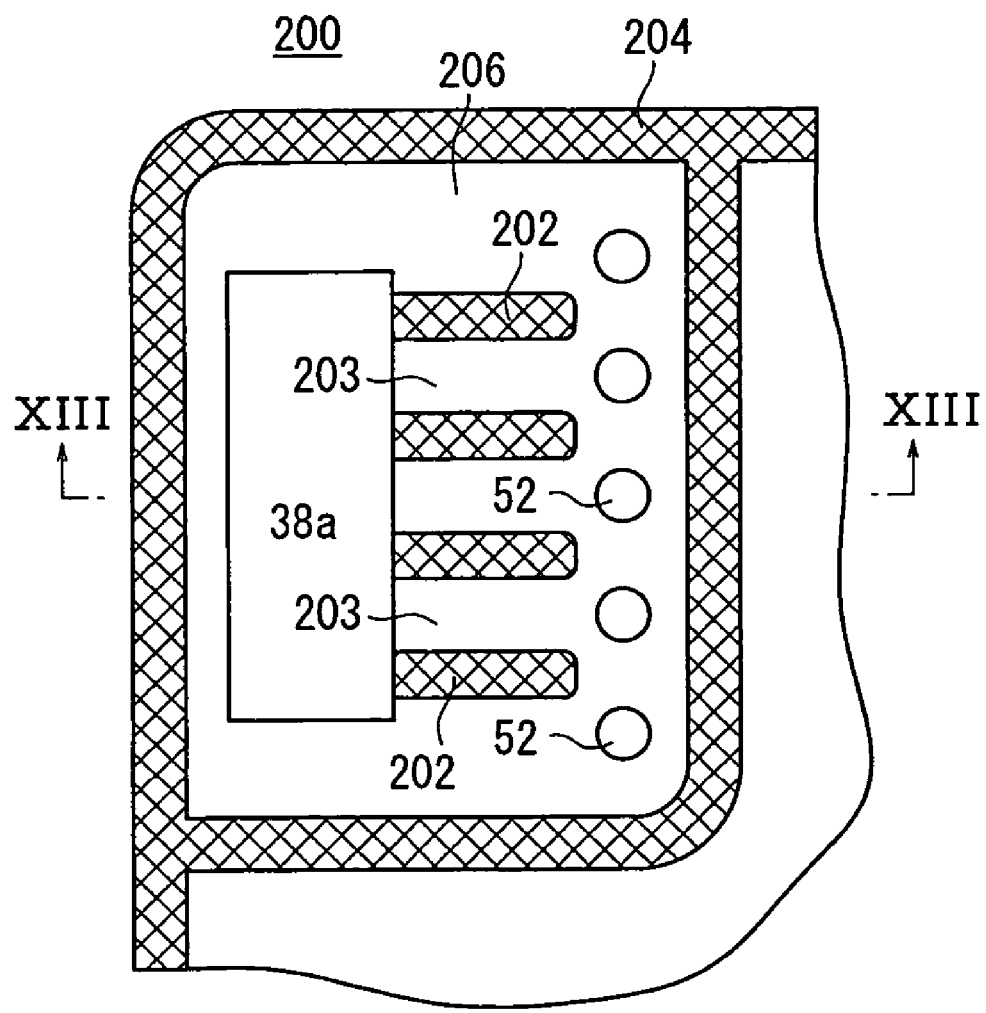
FIG. 12 is a partial front view illustrating a first metal separator according to a fifth embodiment of the present invention.
Figure 13:
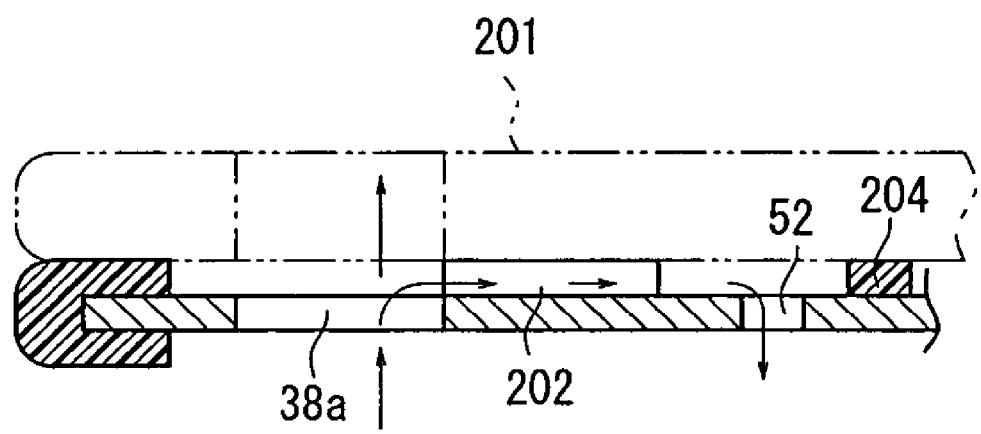
FIG. 13 is a sectional view taken along a line XIII—XIII shown in FIG. 12 in which the first metal separator is stacked on a second metal separator.
Figure 14:
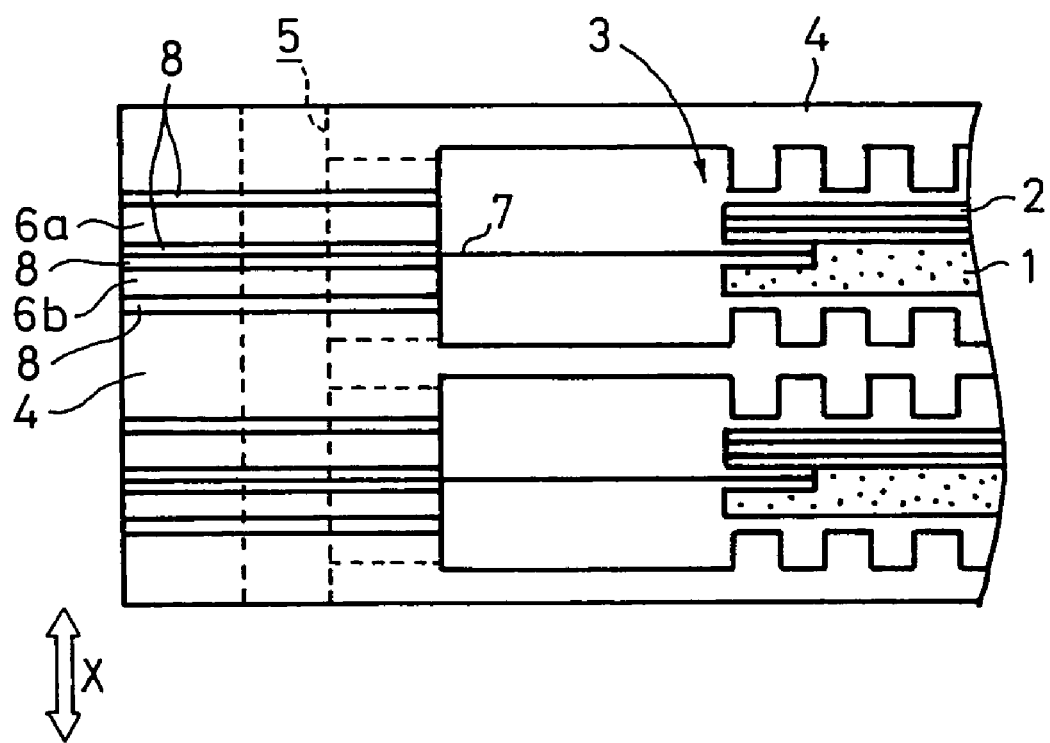
FIG. 14 is a partial vertical sectional view illustrating a fuel cell according to the conventional technique.
Figure 15:
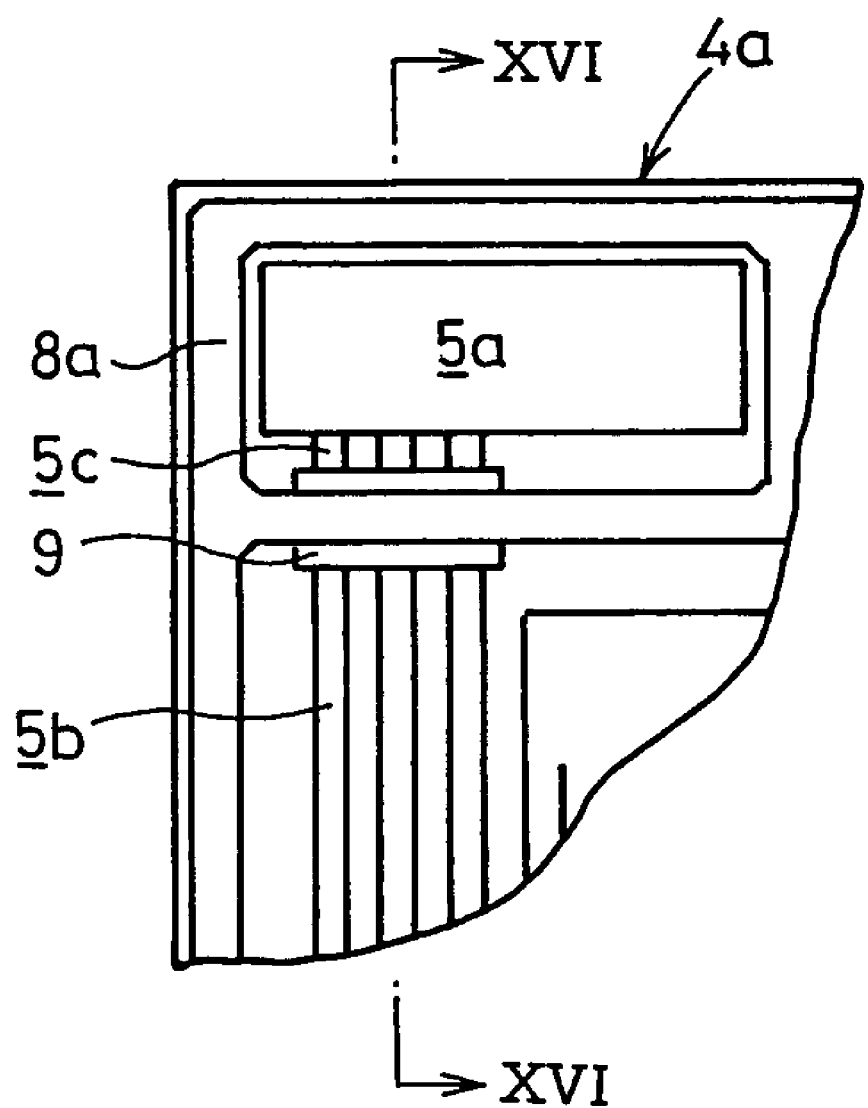
FIG. 15 is a partial front view illustrating a fuel cell according to another conventional technique.
Figure 16:
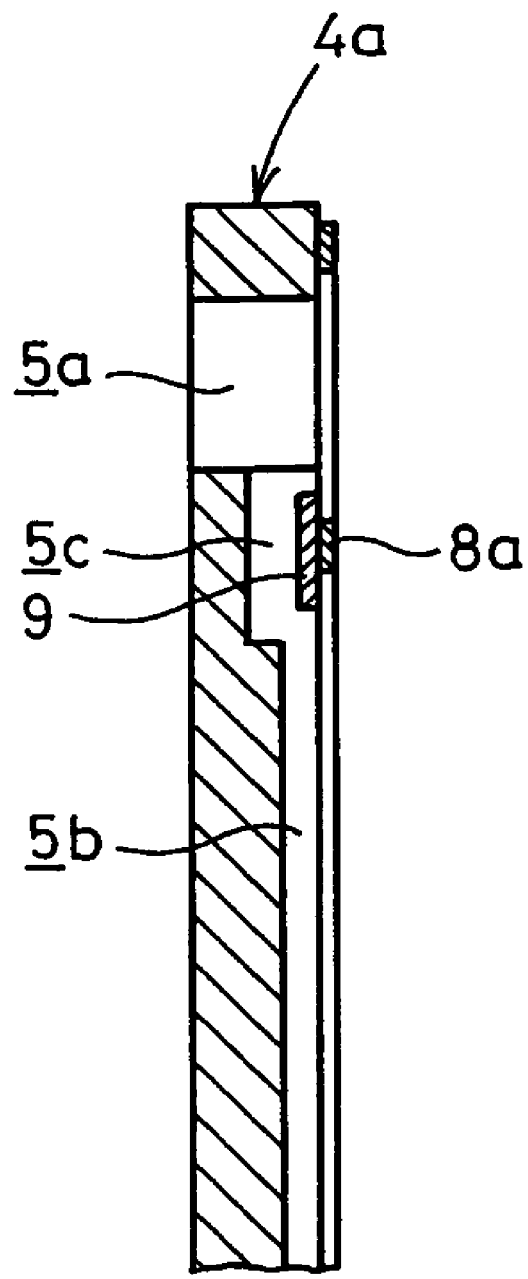
FIG. 16 is a sectional view taken along a line XVI—XVI shown in FIG. 15.
Figure 17:
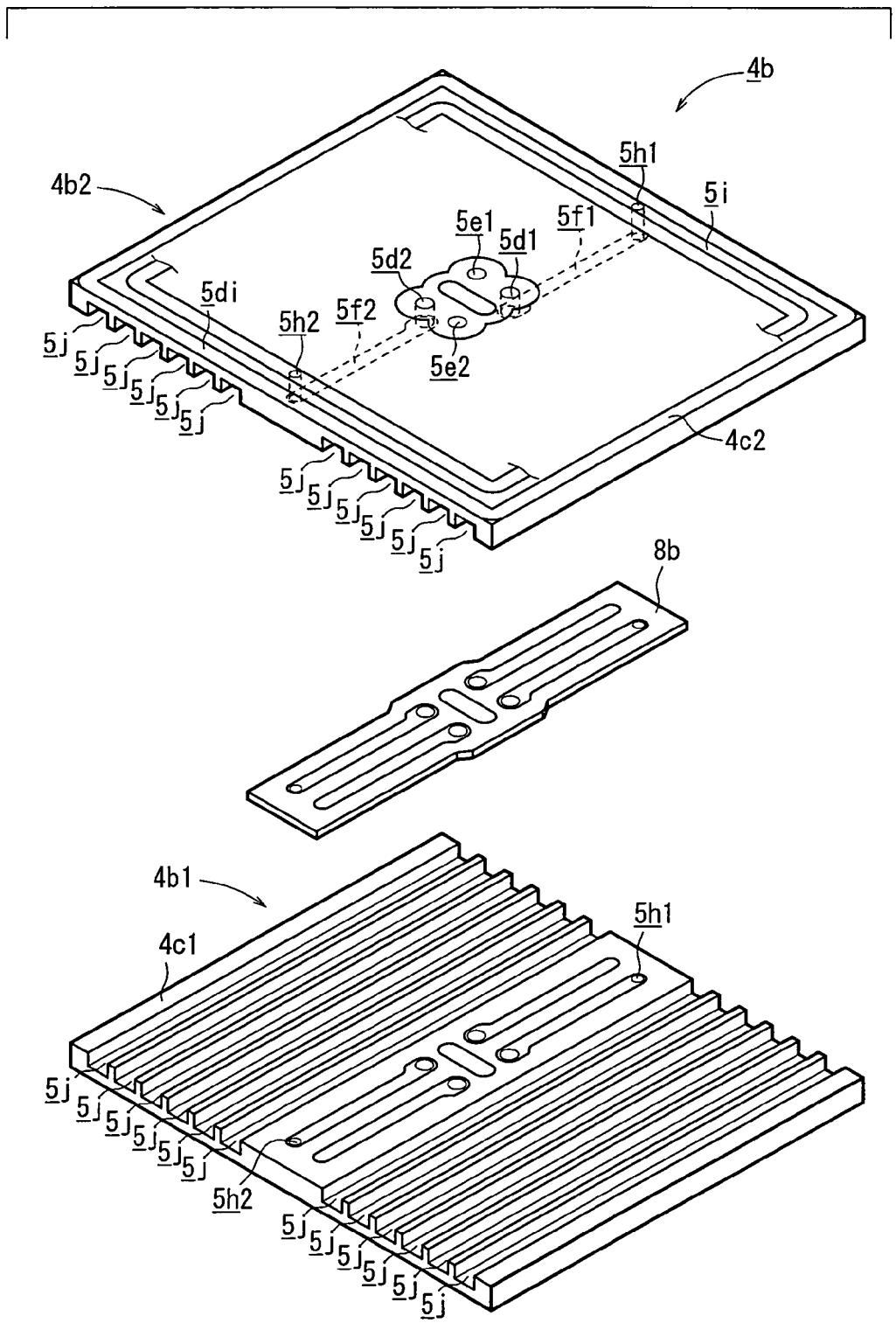
FIG. 17 is an exploded perspective view illustrating a separator of a fuel cell according to still another conventional technique.
Figure 18:
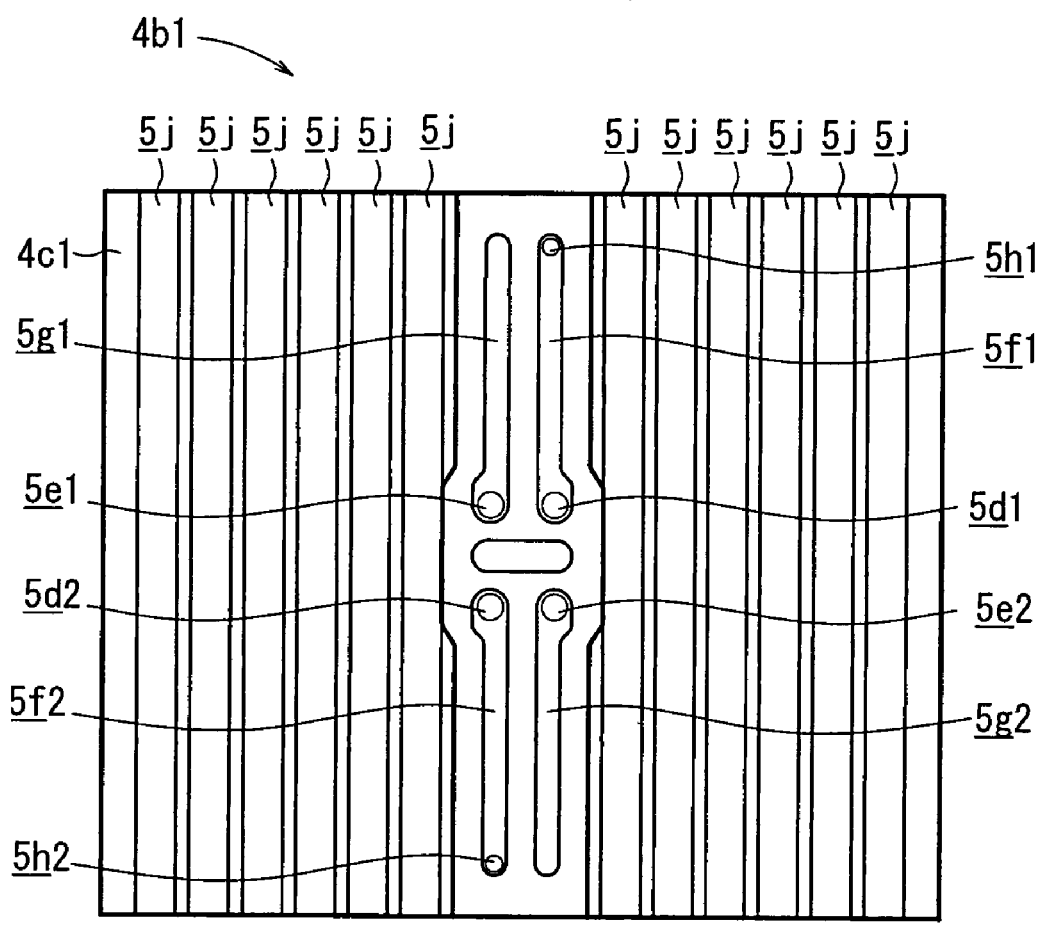
FIG. 18 is a front view illustrating a first surface of the separator shown in FIG. 17.

FIG. 12 is a partial front view illustrating a first metal separator 200 according to the fifth embodiment of the present invention. FIG. 13 is a sectional view taken along a line XIII-XIII shown in FIG. 12. In FIG. 13, the first metal separator 200 is stacked on a second metal separator 201.

The first metal separator 200 is formed of a thin metal plate. Seals 202 are provided between an oxygen-containing gas inlet 38a and through-holes 52. The seals 202 are spaced from the through-holes 52. The seals 202 define flow channels 203 connecting the oxygen-containing gas inlet 38a and the through-holes 52. The seals 202 have a guiding function for guiding the oxygen-containing gas to the through-holes 52, and have a supporting function for supporting the first metal separator 200 to improve the rigidity of the first metal separator 200. Further, the first metal separator 200 has a seal 204. The seals 202 and seal 204 are formed integrally with the first metal separator 200.

The seal 204 has a shape suitable for preventing the leakage of the reaction gases and the cooling medium. A part of the seal 204 surrounding the oxygen-containing gas inlet 38a and the through-holes 52 defines a buffer 206. The first metal separator 200 has an even surface at least at a portion corresponding to the buffer 206. No partitions (e.g., protrusions or grooves) for dividing the through-holes 52 are formed between the through-holes 52.

Though not illustrated, the first metal separator 200 has a buffer between an oxygen-containing gas outlet 38b and through holes 56.

In the fifth embodiment, the oxygen-containing gas is distributed from the oxygen-containing gas inlet 38a to the through-holes 52 through the flow channels 203 in the buffer 206. The oxygen-containing gas is supplied uniformly to the through-holes 52 without any partitions between the through-holes 52.

In the fuel cell according to the present invention, the communication holes which are provided to penetrate through the outer circumferential edge portions of the separator, and the gas flow passages which are provided in the electrode power-generating surface of the separator are communicated with each other by the aid of the connecting flow passages which are communicated with the communication holes on the side of the surface opposite to the side of the electrode power-generating surface. Accordingly, for example, it is unnecessary to fit the thin plate-shaped cover to the side of the electrode power-generating surface. The structure and the assembling steps are simplified all at once. It is possible to economically produce the thin-walled fuel cell having the high quality.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A fuel cell comprising:
   a fuel cell unit including an anode electrode, a cathode electrode, and an electrolyte interposed between said anode electrode and said cathode electrode; and
   separators for supporting said fuel cell unit interposed therebetween, said fuel cell further including:

communication holes forming a manifold penetrating through said separator, said manifold allowing a fuel gas or an oxygen-containing gas to flow therethrough;

at least one gas flow passage provided on an electrode power-generating surface of said separator, for supplying said fuel gas or said oxygen-containing gas to said anode electrode or said cathode electrode; and at least one connecting flow passage penetrating through said separator, said connecting flow passage being different than said manifold, said connecting flow passage connecting said communication hole on a surface opposite to said electrode power-generating surface and said gas flow passage on said electrode power-generating surface, wherein said separator has a buffer on at least one of an inlet side and an outlet side of said gas flow passage, and said buffer is connected to said connecting flow passage.

2. The fuel cell according to claim 1, wherein said connecting flow passage includes flow passage grooves connected to said communication hole on said surface opposite to said electrode power-generating surface; and through-holes penetrating through said separator, said through-holes connecting said flow passage grooves and said gas flow passage.

3. The fuel cell according to claim 1, wherein said fuel cell has a rectangular shape, and said communication holes are provided at upper, central, and lower portions on both sides in the lateral direction of said fuel cell.

4. The fuel cell according to claim 3, wherein said gas flow passage is a serpentine passage;

said communication holes provided at said upper portions on both sides in the lateral direction of said fuel cell are a fuel gas inlet and a fuel gas outlet, and said communication holes provided at said lower portions on both sides in the lateral direction of said fuel cell are an oxygen-containing gas inlet and an oxygen-containing gas outlet; and said fuel gas inlet and said fuel gas outlet are provided at diagonally opposite positions, and said oxygen-containing gas inlet and said oxygen-containing gas outlet are provided at diagonally opposite positions.

5. The fuel cell according to claim 4, wherein said communication holes provided at said central portions on both sides in the lateral direction of said fuel cell are a cooling medium inlet and a cooling medium outlet.

6. A fuel cell comprising:

a fuel cell unit including an anode electrode, a cathode electrode, and an electrolyte interposed between said anode electrode and said cathode electrode; and metal separators for supporting said fuel cell unit interposed therebetween, said fuel cell further including:

communication holes forming a manifold penetrating through said separator, said manifold allowing a fuel gas or an oxygen-containing gas to flow therethrough;

at least one gas flow passage provided on an electrode power-generating surface of said metal separator, for supplying said fuel gas or said oxygen-containing gas to said anode electrode or said cathode electrode; and at least one connecting flow passage penetrating through said metal separator, said connecting flow passage being different than said manifold, said connecting flow passage connecting said communication hole on a surface opposite to said electrode power-generating surface and said gas flow passage on said electrode power-generating surface.

7. The fuel cell according to claim 6, wherein said connecting flow passage includes flow channels connected to said communication hole on said surface opposite to said electrode power-generating surface; and at least one through-hole penetrating through said metal separator, said through-holes connecting said flow channels and said gas flow passage.

8. The fuel cell according to claim 7, further comprising a buffer surrounding said communication hole and said through-hole, wherein said through-hole is provided on an even surface of said metal separator.

9. The fuel cell according to claim 8, wherein a guide is provided in said buffer.

10. The fuel cell according to claim 9, wherein said guide is a seal formed integrally with said metal separator.

11. The fuel cell according to claim 7, wherein said through-hole comprises a plurality of through-holes.

12. The fuel cell according to claim 11, wherein a plurality of guides are formed integrally with a surface of said metal separator, said guides each extending from said communication hole toward a position between said through-holes.

13. The fuel cell according to claim 6, wherein said fuel cell has a rectangular shape, and said communication holes are provided at upper, central, and lower portions on both sides in the lateral direction of said fuel cell.

14. The fuel cell according to claim 13, wherein said gas flow passage is a serpentine passage;

said communication holes provided at said upper portions on both sides in the lateral direction of said fuel cell are a fuel gas inlet and a fuel gas outlet, and said communication holes provided at said lower portions on both sides in the lateral direction of said fuel cell are an oxygen-containing gas inlet and an oxygen-containing gas outlet; and said fuel gas inlet and said fuel gas outlet are provided at diagonally opposite positions, and said oxygen-containing gas inlet and said oxygen-containing gas outlet are provided at diagonally opposite positions.

15. The fuel cell according to claim 14, wherein said communication holes provided at said central portions on both sides in the lateral direction of said fuel cell are a cooling medium inlet and a cooling medium outlet.

* * * * *